United States Patent Office 3,212,709
Patented Oct. 19, 1965

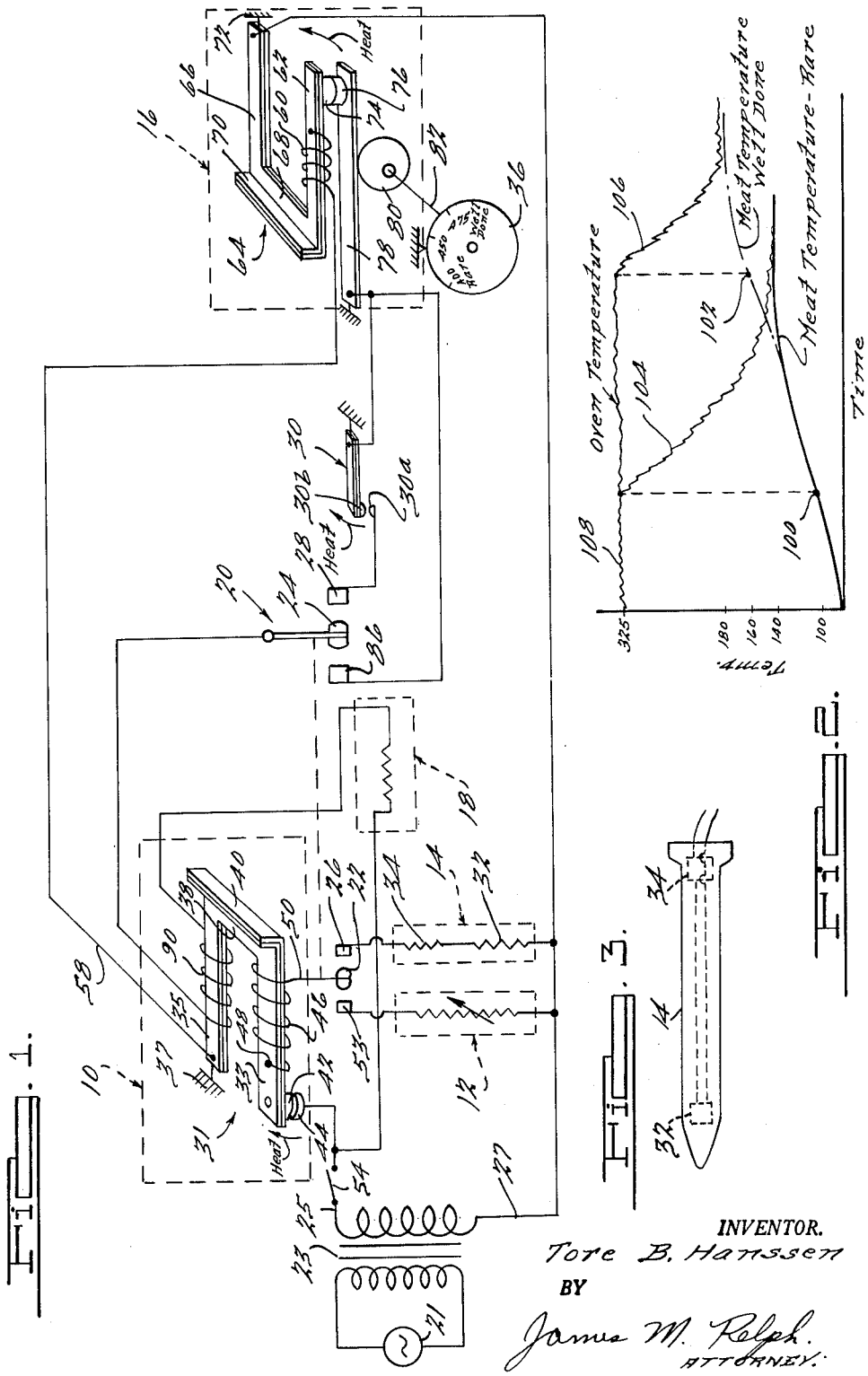

3,212,709
TEMPERATURE CONTROL OF A BODY IN HEATING APPARATUS
Tore B. Hanssen, Ann Arbor, Mich., assignor to King-Seeley Thermos Co., Ann Arbor, Mich., a corporation of Michigan
Filed Oct. 9, 1961, Ser. No. 143,748
13 Claims. (Cl. 236—15)

This invention relates to temperature controlling systems and more particularly to an improved system for conjointly controlling the temperature of an oven cavity in a stove, range or the like, and the temperature of an object in heat transfer relationship therewith and which, alternatively, may be set to maintain a preselected temperature in the oven cavity.

Temperature controlling systems for domestic appliances generally maintain the temperature of an oven cavity or the like at any one of a plurality of preselected temperatures, which temperature is unaffected by the temperature of the food, such as a roast, being cooked. It is desirable that such systems also include means to control the heat input to the oven so as to gradually reduce the oven temperature as the roast approaches a desired degree of doneness so that as the cooking progresses the roast will reach and remain at a desired internal temperature corresponding to such desired doneness such as rare or well done. The present invention provides for both of these modes of operation.

The temperature controlling system of the present invention includes a first or "oven control" sensing means for normal oven temperature control and dual "roast control" sensing means, which alternatively replace the first sensing means in the control circuit, and which are adapted to separately and individually sense the temperature of an oven cavity or the like and an object in heat transfer relationship therewith and effect the aforesaid conjoint control of the oven temperature. The dual sensors conjointly act in combination with suitable electro-responsive means to increase the temperature of the roast to a predetermined temperature corresponding to a desired degree of doneness while lowering the temperature of the oven cavity to the predetermined roast temperature. The temperatures of the oven cavity and the roast are then held constant at the predetermined temperature to prevent further cooking of the roast. The "oven control" senser also acts through the aforesaid electro-responsive means to maintain the preselected oven control, and a further feature of the invention is that a single manually adjustable dial may be used under both conditions of operation of the system so as to select either the desired oven temperature or the desired degree of doneness to be attained by the food being cooked.

Important objects of this invention, therefore, are to provide a selectively and alternatively operable temperature control system as aforesaid; to provide such a system embodying separate "oven control" and "roast control" sensing means; to provide such a system embodying a single adjustable setting means common to both sensing arrangements; to provide such a system in which the "roast control" sensing means conjointly but separately and individually senses the temperature of the oven cavity and the roast or other object therein to control the heat input into the oven cavity so as to increase the temperature of the object in the oven cavity while reducing the temperature of the oven cavity until the temperatures of the object and the oven cavity both reach a predetermined constant temperature; to provide such control by providing a temperature controlling system having first and second resistor means in heat transfer relationship respectively with an oven cavity and an object, and including said first and second resistor means in combination with suitable electro-responsive means which respond to changes in the resistance of said first and second resistor means to control the heat input to said oven cavity; and to provide such a temperature controlling system which, in certain cases, has thermostatic means for maintaining the oven temperature at a predetermined temperature until the resistance of said first and second resistor means reaches a predetermined value at which said electro-responsive means responds to control the heat input to said oven cavity.

With the above, as well as other, and in certain cases more detailed objects in view, a preferred but illustrative embodiment of the invention is shown in the accompanying drawing, in which:

FIGURE 1 is a schematic diagram of a system embodying the principles of the present invention and showing a manual selector switch portion of the system in a neutral position; and FIG. 2 is a temperature-time graph representing the operation of the present invention.

FIGURE 3 shows a probe assembly that may be used in the system of FIG. 1.

As disclosed in FIG. 1 the present system comprises generally a pulser 10 which controls the supply of electric energy to a thermally responsive responder 16 which in turn energizes or de-energizes a load device 18, the illustrated arrangement being such that when load device 18 is energized heat is supplied to the oven cavity and when load device 18 is de-energized the supply of heat to the oven cavity is interrupted. Load device 18 may thus take various forms. For example, it could be an electric heater or the coil of a relay which controls an electric heater or the operating coil of a valve which controls a gas heater. The rate at which pulser 10 supplies energy to the responder 16 and, consequently, the critical temperatures at which responder 16 operates to interrupt or reinitiate the flow of heat to the oven is governed by either an oven control senser 12 or a dual or roast control senser 14. Generically, this control by the sensers of the rate of current supply to responder 16 may be effected in various ways, but preferably, and as is herein illustrated and described in more detail below, this control is effected by governing the effective output voltage of the pulser 10.

The senser 12 may be of known construction and is preferably a resistor having a high temperature coefficient of resistance adapted to be disposed in heat transfer relationship with the interior of an oven in a domestic appliance such as a range, stove or the like. Generically, and as is discussed below in more detail, senser 12 as well as senser 14 may have either a positive or a negative coefficient of resistance, but in the illustrated embodiment it is assumed to be formed of metallic wire which has a high positive temperature coefficient of resistance, such as the wire sold commercially under the trade name "Hitemco."

The dual senser 14 includes serially arranged dual temperature sensing elements 32, 34 which like senser 12 are preferably resistors having a high positive temperature coefficient of resistance. The dual temperature sensing resistors 32, 34 are disposed in heat transfer relationship with an object and a thermal environment, respectively, for conjointly controlling the tempertures of the environment and the object which is in heat transfer relationship therewith. For purposes of this specification, the object will be referred to as a roast or the like and the thermal environment will be referred to as an oven cavity in a range, stove or the like. In order to maintain the resistors 32, 34 in intimate heat transfer relationship, respectively, with the roast and the oven cavity, they are preferably axially spaced in an appropriate probe assembly shown schematically in FIGURE 3, which fully inserts the first serially arranged resistor 32 well within the body of the roast so as to be in heat transfer relationship with only the deep interior of the roast and maintains the second serially arranged resistor 34 without the roast so as to be in heat transfer relationship with the interior of the oven. The probe assembly should be further characterized as inhibiting any substantial amount of heat flow between the parts of the assembly which, respectively, are within and without the roast, so that the "roast" senser responds only to and measures internal meat temperature and the oven senser responds only to and measures oven temperature. Thus qualified, the probe assembly may be of any well known form such as shown, for example, in copending application Serial No. 729,332, filed April 18, 1958, now Patent 2,988,717, in the name of Rudolph Bergsma or as shown, for example, in United States Patent 2,914,644.

A manual selector switch 20 has contacts 22, 24 movable into a first position in which the contact 22 engages a contact 26 connected to the second senser 14 and the contact 24 engages a fixed contact 28 of the temperature controlling system to include a thermostat 30 having a fixed contact 30a and a movable contact 30b as a portion of the control system. The thermostat unit 30 is adapted to be in heat transfer relationship with the interior of the oven. When the selector switch 20 is in the first position, the senser 14 controls the operation of the responder 16 in a manner to be discussed.

Alternatively, the manual selector switch 20 can be moved to a second position in which the contact 22 engages a contact 53 connected to the first senser 12 and the contact 24 engages a contact 86 to shunt the thermostat 30 from the temperature, controlling system. In the second position the senser 12 controls the operation of the responder 16.

The electrical energy for the control system may be, for example, a line source 21 of alternating voltage which is normally subject to substantial variation and, accordingly, one of the functions of the pulser device 10 is to prevent such variations of line voltage from adversely affecting the consistency of operation of the control equipment. An alternating current is supplied to the primary winding of a step-down transformer 23, so that a reduced magnitude voltage appears across the secondary winding of the transformer 23 and hence between the conductors 25, 27 leading from the secondary winding of the transformer. This voltage is applied through either the first senser 12 or the second senser 14, depending upon the position of the selector switch 20, to the pulser or electrothermal voltage regulating device 10, one function of which is to receive the noticeably variable voltage between the conductors 25, 27 on the secondary side of the transformer 23 and to deliver pulsating energy to the responder 16 having an effective value which is substantially independent of the variations in the voltage of the source 21, but which is governed by the resistance of the active senser, 12 or 14.

Basically, the pulser 10 includes a thermally-responsive member 31 at least a portion of which tends to move as a consequence of changes in the temperature thereof.

The thermally-responsive member 31 includes first and second polymetallic leg portions 33, 35 representatively illustrated as lying substantially in a common plane and extending in spaced parallelism with one another in that plane. One end of the second leg portion 35 is anchored or fixed, as is indicated in the drawing by the earthing symbol 37 (which does not connote electrical grounding) and the other end of the second leg portion is joined to one end of the first leg portion 33 by means of a cross-piece 38. An upstanding flange 40 increases the stiffness of the cross-piece 38 to the point where the cross-piece 38 will not deflect to any significant degree in response to the mechanical or thermal forces to which the unit is subjected.

The other end of the first leg portion 33 carries a first electrical contact 42 which is electrically as well as mechanically integral with the leg portion 33. The first contact 42 is adapted to cooperate with a fixed or adjustably fixed second contact 44 and the unit is constructed so that those contacts are in firm engagement with one another when the temperature differential between the first and second leg portions 33, 35 is zero, or substantially zero. It will be appreciated that the provisions of a U-shaped member of the nature shown is one way of obtaining compensation for ambient temperature variations since the effect upon the position of the first contact 42 of heating of the first leg portion 33 is the opposite of that produced by heating of the second leg portion 35.

Differential heating of the first and second leg portions 33, 35 is accomplished by heating means in the form of a heater winding 46 representatively disposed in heat transfer relationship with the first leg portion 33, and more particularly, coiled around that leg portion. One end of the heater winding 46 is electrically connected to the first leg portion as at point 48 and the other end of that winding connects to a conductor 50 which connects to the moveable contact 22 on the selector switch 20.

The heater winding 46 connects in series with the first senser 12 or the senser 14 whichever the case may be, across the secondary winding of the transformer 23 so that current flows through the first and second contacts 42, 44 through the heater winding 46 and through either the senser 12 or the senser 14. The resultant heating of the first leg portion 33 causes the contact carrying end of that portion to deflect in a direction to separate the first contact 42 from the second contact 44. When the first contact 42 and the second contact 44 separate, the energizing circuit for the heater winding 46 is interrupted, and the first leg portion 33 commences to cool, deflecting in a direction to bring the first contact 42 into reengagement with the second contact 44.

The pulser 10 functions to maintain the first and second contacts 42, 44 in a condition of incipient opening and closing with the temperature of the polymetallic first leg portion 33 undulating about that temperature at which the first and second contacts 42, 44 just close. More particularly, the rate of energy consumption may, of course, be expressed in terms of watts ($E^2/R$), and since with relatively constant radiating conditions the heater winding 46 resistance may be assumed to be substantially constant, it follows that the voltage appearing across the winding 46 is substantially constant. For any given value of the resistance of the sensers, it also necessarily follows that the effective voltage appearing between the closed contacts 42, 44 and the conductor 27 remains substantially constant. Increases in senser resistance reduce the magnitude of the current pulses flowing through the heater winding 46. Since the wattage requirement of the heater winding 46 remains constant, this decrease in instantaneous current magnitudes must be and is accompanied by an increase in the ratio between the closed and open periods of the contacts 42, 46 of the pulser 10. Thus, the net effect of increases in senser resistance is to correspondingly increase the effective output voltage from the pulser unit 10, which effective output voltage appears across the responder portion 16 of the improved control circuit.

In the illustrated arrangement, the effective output voltage appearing between an output conductor 58 from the pulser 10 and the conductor 27 is applied across a heater winding 60 on the responder 16. One end of the heater winding 60 connects to a first polymetallic leg portion 62 of a thermally-responsive member 64 which includes a second polymetallic leg portion 66 disposed in spaced parallelism with the first leg portion 62 and connected by a crosspiece 68 which has an upright stiffening flange 70. The tip portion of the second leg portion 66 is anchored as is represented by the earthing symbol 72 in the drawing. The conductor 27 is connected to the second leg portion 66 and hence the thermally-responsive member 64 is at the potential of the conductor 27. Therefore, since one end of the heater winding 60 on the first polymetallic leg portion 62 is electrically connected thereto, it is also connected to the conductor 27 through the crosspiece 68 and the second leg portion 66.

The tip of the first leg portion 62 carries an active contact 74 adapted to cooperate with a passive contact 76 supported upon the free end of a spring contact arm 78. The position of the passive contact 76 is adjustably fixed and, in the illustrated arrangement, the active contact 74 is engaged therewith when the legs of the responder 16 are not differentially heated. As the heater winding 60 elevates the temperature of the first leg portion 62 with which it is associated the active contact 74 is moved away from the passive contact 76. Under any equilibrium condition, the position of the active contact 74 will be determined by the temperature which is sensed by the sensers. Consequently, the temperature at which an indicating or control function is to be initiated may be selected by appropriately positioning the passive contact 76 with respect to the active contact 74.

In the illustrated arrangement, the position of the passive contact 76 is adjusted by pre-tensioning, pre-stressing or biasing the spring contact arm 78 downwardly into engagement with a manually settable cam 80 mounted upon a shaft 82 driven by an adjustable indicating knob 36. Knob 36 carries two concentric scales corresponding respectively to the sensers 12 and 14. The outer scale, for senser 12, is graduated in degrees of oven temperature, and the inner scale, for senser 14, is graduated in degrees of doneness of the food being cooked. If, for example, the senser 12 is controlling the action of the responder 16, a preselected oven temperature is established by rotating the knob 36 to cause the cam 80 to deflect the spring arm 78 upwardly so that the passive contact 76 contacts the active contact 74 to move the first polymetallic leg portion 62 of the thermally-responsive member 64 in an upward direction. The output of the pulser 10 which corresponds to the preselected temperature will energize the heating coil 60 on the first polymetallic leg portion 62 to cause it to deflect upwardly to overcome the deflection imposed thereon and thereby separate the contacts 74, 76 when the preselected temperature is attained.

More particularly, let it be assumed that selector switch 20 is in its left-hand position in which senser 12 is active and in which the thermostat 30 and senser 14 are inactive. If under these conditions, the manual control switch 54 is closed, pulser 10 will behave as described above to repetitively open and close its contacts 42–44 and maintain a voltage between these contacts and conductor 27 which is insensitive to variations in the voltage of source 21 but is dependent upon the resistance and, hence, the temperature of senser 12. It being assumed that the oven has just been turned on, senser 12 may be expected to be at low temperature and, consequently, of low resistance and so each pulse of current supplied to pulser winding 46 is of relatively large magnitude. Under these conditions the closed-to-open time ratio of contacts 42–44 is low and the effective output voltage of pulser 10 is correspondingly low.

Closure of switch 54 also completes a circuit for the load device 18 which extends from source 25 through load device 18 thence through pulser winding 90, the effect of which is described below, contacts 24 and 86 of selector switch 20, spring contact arm 78, now closed contacts 74–76 and body 64 of responder 16, and thence through conductor 27 back to the source 25. As aforesaid, the thus energized load device 18 supplies heat to the oven cavity and causes its temperature to rise.

During each period of closure of the contacts 42–44 of the pulser 10, a pulse of current flows therethrough from the source 25 and thence through the body of member 31, conductor 58, heater coil 60 and body 64 of responder 16, and thence through conductor 27 back to the source 25. These pulses of current elevate the temperature of leg 62 relative to that of leg 66, enabling the pre-stressed spring arm 78 to gradually elevate leg 62 and contacts 74–76. This elevating movement reduces the pressure between contacts 74–76. When the interior of the oven reaches the set temperature, senser 12 attains a temperature and consequently a resistance corresponding to this set temperature and establishes an effective output voltage for pulser 10 which causes the integrated value of the pulses of current being supplied to heater winding 60 to bring leg 62 to a temperature at which contacts 74–76 open, thereby interrupting the supply of current to the load device 18. Neglecting for the moment the effect of winding 90 of pulser 10, this initiates a reduction in the temperature within the oven cavity which in turn reduces the resistance of senser 12 which in turn reduces the effective value of the voltage output of pulser 10. This reduction in turn lowers the integrated value of the current pulses being supplied heater winding 60 and allows contacts 74–76 to reclose reinitiating the supply of heat to the load device 18 and reinitiating an increase in the oven temperature.

As is described in more detail in the copending application of the present applicant, Serial No. 773,286, for Electro-Responsive System, filed November 12, 1958, now Patent No. 3,069,524, and incorporated herein by reference, winding 90 is disposed on the back leg 35 of pulser 10 and so acts in opposition to winding 46. Winding 90 is connected directly in series with load device 18 and contact 74–76 and is energized throughout each period of energization of the load device 18. Winding 90 thus tends to delay the opening of contacts 42–44 and so tends to increase the output voltage of pulser 10. This in turn tends to increase the value of the current pulses being supplied heater winding 60 of responder 16 and so tends to hasten the opening of contact 74–76 and the consequent interruption of the supply of current to the load device 18. When the supply of current to load device 18 is interrupted, however, the supply of heat to winding 90 is also interrupted and this action in turn enables winding 46 to more promptly reopen contacts 42–44 thereby reducing the on-off time ratio of pulser 10 and, consequently, reducing its output voltage. This action in turn reduces the value of the pulses current being supplied to winding 60 of responder 16 and tends to hasten or cause a reclosure of contact 74–76. Preferably, and in accordance with the description of the aforesaid copending application, winding 90 is proportioned so as to cause a repetitive opening and closing of contacts 74–76 when the set temperature is attained, even though the oven temperature and consequently the temperature of the active senser 12 (or 14 as the case may be) does not appreciably change.

In the preferred embodiment accordingly and utilizing senser 12, the oven temperature is maintained substantially constant at the set temperature, determined by the setting of knob 36 and cam 80, and at that temperature contact 74–76 repetitively open and close causing repetitive pulses of heat to be supplied to the load device 18, such pulses having an integrated value sufficient to maintain the oven at substantially the set temperature.

Considering now the action of the system with selector switch 20 in its right-hand position, in which senser 12 is inactive and senser 14 and thermostat 30 active, the system is again put into operation by closing switch 54 and turning knob 36 to a position in which the inner or "doneness" scale registers with the fixed indexing point adjacent the scale. As before, closure of switch 54 connects the load device 18 through the now closed responder contacts 74–76 causing the oven temperature to relatively rapidly rise to a value at which thermostat 30 opens. Thermostat 30 may be set at some arbitrary temperature, for example 325° F. and acts in conventional fashion to maintain the oven temperature at substantially its set temperature.

As before stated, resistors 32 and 34 of senser 14 are serially connected and consequently the output voltage of pulser 10 is determined by the sum of the resistances of elements 32 and 34. As also before stated, resistor 32 is positioned within and responds to the internal temperature of the roast and resistor 34 responds to the oven temperature. At the beginning of a roasting operation the oven temperature is relatively high (for example 325° as aforesaid) and, consequently, the resistance of element 34 is relatively high. At this time however the roast may be assumed to be at about room temperature, and consequently the resistance of element 32 is relatively low. The proportioning and values of elements 32 and 34 with respect to each other and with respect to senser 12 is discussed in more detail below, but it will be understood that at the start of a roasting operation the just described resistances of elements 32 and 34 establish an output voltage for pulser 10 which is too low to enable the supply of sufficient current to heater winding 60 of responder 16 to cause opening of contacts 74–76. Throughout the early stages of the roasting operations, consequently, these contacts remain closed and load device 18 is controlled only by thermostat 30 and consequently the interior temperature of the oven is maintained at the set value such as 325°.

In accordance with the present invention as aforesaid, it is desired that as the internal temperature of the roast approaches the final degree of doneness and consequently a predetermined desired final temperature, the supply of heat to the oven is controlled in such a way as to gradually reduce the temperature within the oven. The relationship is such that the oven temperature is brought down to the final desired internal temperature of the meat at substantially the same time that the internal temperature of the meat reaches the set value. Thereafter, the oven temperature is maintained at this set value and the roast may be left in the oven without causing further cooking thereof.

As an example, in producing a rare roast, a final internal temperature of approximately 140° is desired and as a further example an anticipation point or anticipation temperature (i.e. the roast temperature at which the "drive down" or reduction in oven temperature begins) of approximately 100° F. is appropriate. On the other hand, if a well done roast is desired a final temperature of between 185° and 200° is appropriate and an anticipation temperature of about 165° F. is appropriate. Intermediate degrees of doneness of course require intermediate final temperature and intermediate anticipation points.

As the internal temperature of the meat rises, the resistance of senser element 32 correspondingly rises thereby correspondingly increasing the summed resistance value of element 32 and 34. This causes a corresponding progressive increase in the output voltage of the pulser 10 and a corresponding progressive increase in the integrated value of the pulses of current supplied heating winding 60 of responder 16. Assuming that the knob 36 has been set for rare meat, it will be understood that when senser element 32 attains a temperature of substantially 100° F. (with the oven and senser 34 at 325° F.), the output voltage of pulser 10 and consequently the integrated value of current pulses supplied heater winding 60 have a value just sufficient to cause contacts 74–76 to open. As before, this interrupts the supply of heat to the load device 18 and initiates reduction in the oven temperature.

Such a reduction lowers the temperature of senser element 34 and decreases its resistance. Even though the oven temperature is falling, the internal temperature of the meat continues to rise because that temperature is still considerably lower than the internal temperature in the oven. This continued increase in internal meat temperature progressively increases the resistance of senser element 32. It will be appreciated that so long as the summed resistances of elements 32 and 34 remain at the "anticipation value" heater winding 60 of responder 16 will receive sufficient heat energy to maintain contacts 74 and 76 in the open position, subject only to the repetitive opening and closing action caused by winding 90. If the oven temperature should tend to fall too rapidly, the summed resistance of senser 14 would tend to decrease (due to reduction in resistance of element 34) and this in turn would tend to elevate the voltage of pulser 10 and increase the integrated value of current pulses supplied heating winding 60 of responder 16 and cause a reclosure of contact 74–76 and a reinitiation of heating action. On the other hand, if the fall in oven temperature tends to drag behind the rise in internal temperature of the meat, the summed value of senser 14 tends to become unduly high which either maintains contacts 74–76 continuously open or at least reduces the ratio of the closed-to-open time periods of these contacts. Accordingly, by properly correlating the temperature falling characteristics of the oven relative to its heat supply source and relative to the characteristics of responder 16 and other elements of the system, the drive down temperature curve of the oven may be caused to substantially match the continued rising temperature curve of the meat so that the oven temperature reaches the final desired value 140° for rare meat at substantially the same time that the internal temperature of the meat reaches that temperature. Thereafter, the summed value of resistance value of 32 and 34 remain at the anticipation value, i.e., the value needed to produce an output voltage of pulser 10 which causes the integrated value of current pulses supplied to winding 60 to be just sufficient to open contact 74–76. This summed resistance remains substantially constant thereafter and as in the case of the use of senser 12, pulser winding 90 remains effective to repetitively open and close contact 74–76 causing the load device 18 to receive repetitive pulses of heat of such integrated value as to maintain the desired oven and meat temperature.

It will be understood that if the knob 36 is set at a well done point the prestress in spring contact 78 is greater than at the rare setting and consequently a higher voltage for pulser 10 and a higher integrated value of current pulses for heater winding 60 are needed to initially cause the opening of contacts 74–76 and initiate the drive down of the oven temperature. In this instance accordingly, the summed value of resistance elements 32 and 34 does not attain the critical value needed to initiate the oven temperature drive down until the higher anticipation point or anticipation temperature corresponding to well done meat, is reached. As before stated, this anticipation temperature for well done meat may be approximately 165° F.

The above discussed relationships between anticipation temperatures and final temperatures are depicted in FIGURE 2 in which the curve shown in solid lines represents the rise in temperature of meat being cooked to a rare condition. Oven temperature remains at 325° as indicated by the curve portion 108 until the anticipation temperature 100° is attained at which time the "drive down" or reduction in oven temperature begins and takes place along the curve 104. The dashed curve represents well done cooking conditions and in this instance the oven temperature remains at the 325° F. value until the somewhat higher anticipation temperature (approximately 165° F.) is attained, at which time the oven temperature is reduced and falls away as indicated by the curve portion 106.

Coming now to an illustrative determination of values for senser 12 and element 32 and 34 of senser 14 which provide the aforesaid actions and enable the use of a single setting knob 36 acting through a single cam 80 to be used under both conditions of operation of the system, it will be understood that both sensers 12 and 14 preferably utilize resistance elements having similar characteristics, and that both sensers exhibit substantially the same temperature-resistance characteristics.

In practice, very satisfactory oven control operation using apparatus of the above described type has been achieved utilizing, as sensor 12, a length of the previously mentioned wire sold under the trade name "Hitemco" having a resistance of 10 ohms at 68° F. As an example, such an element may be used in the present combination "oven control" and "roast control" system. At a 400° F. oven temperature such a sensor 12 has a resistance of 20 ohms. Preferably, but not necessarily, resistors 32 and 34 are so selected that their summed resistance equals 20 ohms at the final temperature (140°) for rare meat and, consequently, the rotative position of the knob 36 for rare meat is the same as the rotative position thereof which gives a 400° oven setting when sensor 12 is active and sensor 14 is inactive. Resistance elements of the indicated kind having a summed resistance of 20 ohms at 140° F. have a summed resistance of 16.5 ohms at 68° F.

With reference now to the ratio between the values of resistance of elements 32 and 34 it will be recalled that in the illustrated arrangement, the summed resistances at the anticipation point and at the final temperature are equal. At the anticipation point for rare meat the oven resistor 34 is at 325°, at which temperature its resistance is 1.7 times its resistance at 68° F.; and the roast resistor 32 is at 100° F., at which temperature its resistance is 1.09 times its resistance at 68° F. At final temperature for the rare meat, however, both resistors 32 and 34 are at 140°, at which temperature their resistances are 1.21 times their resistances at 68° F. These relationships establish the following equation:

$$1.7 \times R_{34} + 1.09 \times R_{32} = 1.21(R_{32} + R_{34})$$

in which equation $R_{34}$ is the resistance of element 34 at 68° F. and $R_{32}$ is the resistance of element 32 at 68° F. Solution of this equation shows $R_{32} = 4R_{34}$. As indicated above a preferred summed value of resistances 32 and 34 at 68° is 16.5 ohms, in which event element 32 has a value at 68° of 13.2 ohms and resistance element 34 has a value at that temperature of 3.3 ohms.

The above 4:1 ratio involves a slight compromise as well done settings are approached but the errors introduced by maintaining this ratio for all settings have in practice been found to be well within commercial tolerances. Variations from set temperatures are more noticeable at the rare end of the scale than at the well done end of the scale, and consequently it is preferred as indicated above to adopt values which give maximum accuracy at the rare end of the scale.

With further reference to the use of resistance elements having negative temperature coefficients of resistance, such as those known as "Thermistors," it will be recalled that, generically, the function of sensors 12 and 14 is to increase the integrated value of current pulses supplied the winding 60 of responder 16 with increases in sensed temperature. Accordingly, in the broader aspects of the invention, sensers 12 and 14 may be eliminated from the circuit of pulser winding 46 (so that the effective voltage of the pulser 10 remains substantially constant) and interposed in parallel with each other (subject to selector switch 20) in line 58 leading to heater coil 60. Thus arranged, the active senser 12 or 14, as the case may be, would at low temperatures limit the current pulses supplied winding 60 to relatively low values and cause these pulses to be progressively increased in magnitude as the sensed temperature increased. Alternatively, within the broader aspects of the invention, the illustrated elements 12 and 14 could be replaced by thermisters, by connecting such elements 12 and 14 (subject to switch 20) in parallel with pulser winding 46, and connecting a series dropping resistor in series with the parallel network 12–14–46. Again, in the broader aspects of the invention, the illustrated sensers 12 and 14 could be replaced by thermisters by eliminating them from the circuit of pulser winding 46 and placing them in circuit with an additional heater winding arranged on the back leg 35 of thermal element 31, but otherwise connected as shown for winding 46. It will, of course, be understood that with these variants of the illustrated arrangement, new resistance values for the various elements would be needed and would be determined in accordance with the principles hereinabove discussed.

It will be understood that the specific construction of the improved temperature control and apparatus which is herein disclosed and described is presented for purposes of explanation and illustration and is not intended to indicate limits of the invention, the scope of which is defined by the following claims.

What is claimed is:

1. Control means for an oven or the like space in which a body such as a roast may be raised from a lower to a desired higher temperature and having a source of heat capable of maintaining said space at a temperature above said higher temperature, comprising first and second electrical heat sensing elements connected in circuit in series and adapted to be disposed respectively to sense temperatures within said space and within said body, said first element being substantially insensitive to said temperature within said body and said second element being substantially insensitive to said temperature within said space except as such space temperature affects the temperature of the body, each said element having an electrical characteristic which varies with the temperature of the element, an electrical control circuit effective to control the application of heat to said body from said source of heat, said first and second sensing elements forming part of said electrical control circuit and being connected in series in said circuit to produce a combined electrical effect therein, and means operably responsive to said electrical characteristics of said elements and controlled jointly by said elements for controlling said source of heat so as to progressively reduce the supply of heat to said space as said body approaches a said desired temperature so that said body attains but does not substantially rise above said desired temperature.

2. Control means for an oven or the like space in which a body such as a roast may be raised from a lower to a desired higher temperature and having a source of heat capable of maintaining said space at a temperature above said higher temperature, comprising first and second sensing elements adapted to be disposed respectively to sense temperatures within said space and within said body, said first element being substantially insensitive to said temperature within said body and said second element being substantially insensitive to said temperature within said space except as such space temperature affects the temperature of the body, each said element having an electrical characteristic which varies with the temperature of the element, an electrical control circuit effective to control the application of heat to said body from said source of heat, said first and second sensing elements forming part of said electrical control circuit and being connected in said circuit to produce a combined electrical effect therein, said first and second sensing elements comprising resistance elements having varying resistance value in said electrical control circuit dependent upon temperature, said first and second sensing elements being connected in series to control current flow in said control circuit and heating of said body from said source in accordance with the total resistance value of said sensing elements, and means operably responsive to said electrical characteristics of said elements and controlled jointly by said elements for controlling said source of heat so as to progressively reduce the supply of heat to said space as said body approaches a said desired temperature and cause said temperatures of said space and body to level off and be maintained at substantially said desired value.

3. Control means for an oven or the like space in which a body such as a roast may be raised from a lower to a desired higher temperature and having a source of heat therefor comprising means for controlling said source so as to maintain said space at a temperature above said higher temperature, first and second sensing elements connected in circuit in series and adapted to be disposed respectively to sense temperatures within said space and within said body, a common support means for said first and second sensing elements adapted to support said second sensing element in a position imbedded within and substantially surrounded by said body, said common support being in the form of a probe assembly having said first electrical sensing element and said second electrical sensing element axially spaced therein, said first element being substantially insensitive to said temperature within said body and said second element being substantially insensitive to said temperature within said space except as such space temperature affects the temperature of the body, each said element having an electrical characteristic which varies with the temperature of the element, and means operably responsive to said electrical characteristics of said elements and controlled jointly by said elements for controlling said source of heat so as to progressively reduce the supply of heat to said space as said body approaches a said desired temperature so that said body attains but does not substantially rise above said desired temperature.

4. Control means for an oven or the like space in which a body such as a roast may be raised from a lower to a desired higher temperature and having a source of heat therefor comprising means for controlling said source so as to maintain said space at a temperature above said higher temperature, first and second sensing elements adapted to be disposed respectively to sense temperatures within said space and within said body, said first element being substantially insensitive to said temperature within said body and said second element being substantially insensitive to said temperature within said space except as such space temperature affects the temperature of the body, each said element having an electrical characteristic which varies with the temperature of the element, and bimetal means operably responsive to said electrical characteristics of said elements and controlled jointly by said elements for controlling said source of heat so as to progressively reduce the supply of heat to said space as said body approaches a said desired temperature and cause said temperatures of said space and body to level off and be maintained at substantially said desired value.

5. Control means for an oven or the like space in which a body such as a roast may be raised from a lower to a desired higher temperature and having a source of heat capable of maintaining said space at a temperature above said higher temperature, comprising first and second sensing elements adapted to be disposed respectively to sense temperatures within said space and within said body, said first element being substantially insensitive to said temperature within said body and said second element being substantially insensitive to said temperature within said space except as such space temperature affects the temperature of the body, each said element having an electrical characteristic which varies with the temperature of the element, an additional sensing element disposed to sense only the temperature within said space, heat control means, and transfer means selectively operable to render said heat control means subject to control jointly by said first and second elements or by said additional sensing element, said heat control means when controlled jointly by said first and second elements controlling said source of heat so as to progressively reduce the supply of heat to said space as said body approaches a said desired temperature so that said body attains but does not substantially rise above said desired temperature, and when controlled by said additional element controlling said source so as to maintain the temperature of said space at a predetermined value unaffected by the temperature of said body.

6. Control means for an oven or the like space in which a body such as a roast may be raised from a lower to a desired higher temperature and having a source of heat capable of maintaining said space at a temperature above said higher temperature, comprising first and second sensing elements adapted to be disposed respectively to sense temperature within said space and within said body, said first element being substantially insensitive to said temperature within said body and said second element being substantially insensitive to said temperature within said space except as such space temperature affects the temperature of the body, each said element having an electrical characteristic which varies with the temperature of the element, an additional sensing element disposed to sense only the temperature within said space, heat control means, transfer means selectively operable to render said heat control means subject to control jointly by said first and second elements or by said additional sensing element, said heat control means when controlled jointly by said first and second elements controlling said source of heat so as to progressively reduce the supply of heat to said space as said body approaches a said desired temperature so that said body attains but does not substantially rise above said desired temperature, and when controlled by said additional element controlling said source so as to maintain the temperature of said space at a predetermined value unaffected by the temperature of said body, and a single control means operable to adjust said heat control to vary said desired temperature and said predetermined temperature.

7. Control means for an oven or the like space in which a body such as a roast may be raised from a lower to a desired higher temperature and having a source of heat capable of maintaining said space at a temperature above said higher temperature, comprising first and second sensing elements adapted to be disposed respectively to sense temperatures within said space and within said body, said first element being substantially insensitive to said temperature within said body and said second element being substantially insensitive to said temperature within said space except as such space temperature affects the temperature of the body, each said element having an electrical resistance which varies with the temperature of the element and electrical heat control means controlled jointly by said elements for controlling said source of heat so as to progressively reduce the supply of heat to said space as said object approaches a said desired temperature so that said body attains but does not substantially rise above said desired temperature, said electrical heat control means including thermal means controlling said source and which governs said source in accordance with the temperature attained by said thermal means, and electrical circuit means controlling said temperature of said thermal means in accordance with summed resistance value of said first and second elements.

8. Control means for an oven or the like space in which a body such as a roast may be raised from a lower to a desired higher temperature and having a source of heat therefor, comprising means for controlling said source so as to maintain said space at a temperature above said higher temperature, first and second sensing elements adapted to be disposed respectively to sense temperatures within said space and within said body, said first element being substantially insensitive to said temperature within said body and said second element being substantially insensitive to said temperature within said space except as such space temperature affects the temperature of the body, each said element having an electrical resistance which varies with the temperature of the element, and heat control means controlled jointly by said elements for controlling said source of heat so as to progressively reduce the supply of heat to said space as said body approaches a said desired temperature so that said body attains but does not substantially rise above said desired temperature, said heat control means including thermal means controlling said source and which governs said source in accordance with the temperature attained by said thermal means, and bimetallic switching means controlling said temperature of said thermal means in accordance with summed resistance value of said first and second elements.

9. Control means for an oven or the like space in which a body such as a roast may be raised from a lower to a desired higher temperature and having a source of heat capable of maintaining said space at a temperature above said higher temperature, comprising first and second sensing elements adapted to be disposed respectively to sense temperatures within said space and within said body, said first element being substantially insensitive to said temperature within said body and said second element being substantially insensitive to said temperature within said space except as such space temperature affects the temperature of the body, each said element having an electrical resistance which varies with the temperature of the element, and heat control means controlled jointly by said elements for controlling said source of heat so as to progressively reduce the supply of heat to said space as said body approaches a said desired temperature so that said body attains but does not substantially rise above said desired temperature, said heat control means including pulsing means operable to deliver a succession of pulses of current at an effective voltage substantially unaffected by variations in voltage of an associated source, responder means responsive to the integrated value of said pulses and means rendering said integrated value subject to control by the summed resistance value of said first and second elements.

10. Control means for an oven or the like space in which a body such as a roast may be raised from a lower to a desired higher temperature and having a source of heat capable of maintaining said space at a temperature above said higher temperature, comprising first and second sensing elements adapted to be disposed respectively to sense temperatures within said space and within said body, a common support means for said first and second sensing elements for supporting said second sensing element in an imbedded position within said body and supporting said first sensing element in spaced relationship therefrom within said space, said first element being substantially insensitive to said temperature within said body and said second element being substantially insensitive to said temperature within said space except as such space temperature affects the temperature of the body, each said element having an electrical resistance which varies with the temperature of the element, heat control means controlled jointly by said elements for controlling said source of heat so as to progressively reduce the supply of heat to said space as said body approaches a said desired temperature and cause said temperatures of said space and body to level off and be maintained at substantially said desired value, said heat control means including pulsing means operable to deliver a succession of pulses of current at an effective voltage substantially unaffected by variations in voltage of an associated source, responder means responsive to the integrated value of said pulses, and means rendering said integrated value subject to control by the summed resistance value of said first and second elements.

11. Control means for an oven or the like space in which a body such as a roast may be raised from a lower to a desired higher temperature and having a source of heat capable of maintaining said space at a temperature above said higher temperature, comprising first and second sensing elements adapted to be disposed respectively to sense temperatures within said space and within said body, said first element being substantially insensitive to said temperature within said body and said second element being substantially insensitive to said temperature within said space except as such space temperature affects the temperature of the body, each said element having an electrical resistance which varies with the temperature of the element, and heat control means controlled jointly by said elements for controlling said source of heat so as to progressively reduce the supply of heat to said space as said body approaches a said desired temperature and cause said temperatures of said space and body to level off and be maintained at substantially said desired value, said heat control means including pulsing means operable to deliver a succession of pulses of current at an effective voltage substantially unaffected by variations in voltage of an associated source, responder means responsive to the integrated value of said pulses, and means rendering said effective voltage subject to control by the summed resistance value of said first and second elements.

12. In control means for an oven or like space in which a body such as a roast may be raised from a lower to a desired higher temperature comprising; a source of electrical energy, heating means for said oven energizable by said source to supply heat to said oven, a first circuit for energizing said heating means, switch means operable to control said first circuit, a second circuit including means operatively connected to said switch means to alternately open and close said switch means and energize and deenergize said first circuit, a plurality of sensing elements forming part of said second circuit and adapted to be disposed respectively to sensed temperatures within said space and within said body, and means in said second circuit responsive to the electrical characteristics of said sensing elements to actuate said means operatively connected to said switch means to progressively reduce the supply of heat to said space as said body approaches a uniform preselected desired temperature and to control the amount of heat supplied to said oven so that the body attains but does not substantially rise above the desired temperature.

13. In a control means for an oven or like space in which a body such as a roast may be raised from a lower to a desired higher temperature comprising; a source of electrical energy, heating means for said oven energizable by said source to supply heat to said oven; a first circuit for energizing said heating means, said first circuit including a bimetal switch means operable to control energization of said first circuit, thermostat means connected in said first circuit to deenergize said circuit at a preselected oven temperature; a second circuit including heating means operatively connected to said bimetal switch means to alternately open and close said switch means in response to energization of said second circuit to alternately energize and deenergize said first circuit, a second bimetal switch means operable to control said second circuit; a third circuit having a plurality of sensing elements forming part of said third circuit and adapted to be disposed respectively to sensed temperatures within said space and within said body, and heating means in said third circuit operatively connected to said second switching means and responsive to variations in the electrical characteristics of said sensing elements to open and close said second bimetal switch means and control the amount of heat supplied to said oven so that the body attains but does not substantially rise above the desired temperature.

References Cited by the Examiner
UNITED STATES PATENTS

| | | | |
|---|---|---|---|
| 2,015,838 | 10/35 | Borden et al. | 236—15 X |
| 2,366,501 | 1/45 | Gille | 236—91 |
| 2,375,988 | 5/45 | Gille et al. | 236—91 |
| 2,510,038 | 5/50 | Rudahl | 219—20.41 |
| 2,556,081 | 6/51 | Hartman | 236—15 |
| 2,910,569 | 10/59 | Boddy | 219—20.41 |
| 2,914,644 | 11/59 | Holtkamp | 236—15 X |

EDWARD J. MICHAEL, *Primary Examiner.*
ALDEN D. STEWART, *Examiner.*